Nov. 21, 1939.  H. J. DUNKELOW  2,180,403
CLUTCH
Filed Sept. 18, 1937
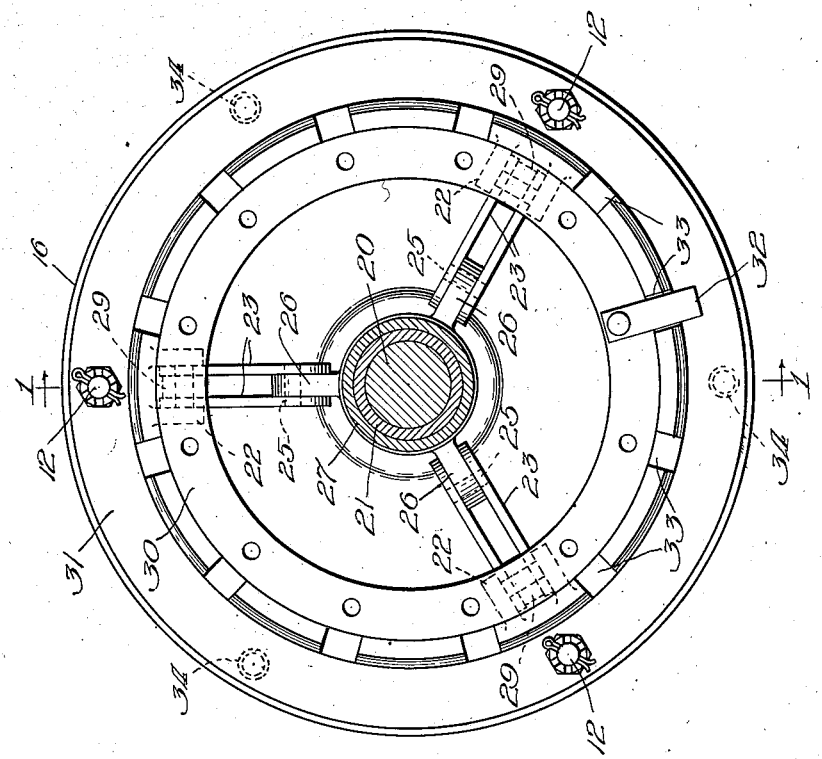
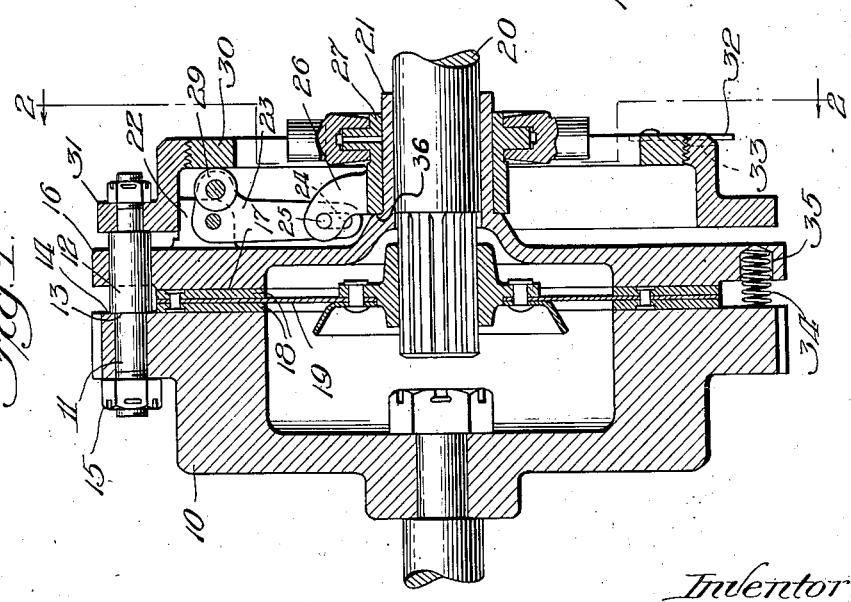
Inventor:
Henry J. Dunkelow.
by Davis, Lindsey, Smith & Shonts
Attys.

Patented Nov. 21, 1939

2,180,403

UNITED STATES PATENT OFFICE 2,180,403

CLUTCH

Henry J. Dunkelow, Racine, Wis., assignor to Twin Disc Clutch Company, Racine, Wis., a corporation of Wisconsin Application September 18, 1937, Serial No. 164,431

2 Claims. (Cl. 192—68)

My invention relates to clutches and more particularly to those of the mechanically loaded type.

The principal object of my invention is to devise a clutch in which the clamping plate, actuating mechanism and adjusting device constitute a unit that is supported and drivably connected by studs to a rotary part which acts as a member of the clutch.

A further object is to devise a clutch of the character indicated in which the clutch or operating levers are locked in driving position against inadvertent release and are held in release position by the extending action of release springs.

These and further objects of my invention will be set forth in the following specification, reference being had to the accompanying drawing, and the novel means by which said objects are effectuated will be definitely pointed out in the claims.

In the drawing:

Figure 1 is a sectional elevation of my improved clutch taken along the line 1—1 of Fig. 2, looking in the direction of the arrows.

Fig. 2 is an end elevation of the clutch, partly in section, as viewed along the line 2—2, looking in the direction of the arrows.

Referring to the drawing, the numeral 10 designates a flywheel which is generally representative of any rotary part that is interconnected by the clutch mechanism presently described, and which, for convenience, will be regarded as the driving member, although the conditions of operation in this respect may be reversed. The reduced portions of a plurality of driving studs 11 are equally spaced around the flywheel adjacent the periphery thereof, and extend through the wheel as generally indicated in Fig. 1. To the right of the flywheel, each stud is formed with an enlarged portion 12 which forms with the portion 11 a shoulder 13 that is held against the face 14 of the flywheel by a nut 15.

Each enlarged stud portion 12 extends through and has driving connection with a clamping plate 16 having a face 17 which, together with the flywheel face 14, engages with facings of friction material 18 secured to opposite surfaces of a friction or driven plate 19 that is rotarily connected to a driven shaft 20, but which is capable of being moved axially with respect thereto. The shaft 20 constitutes the other rotary part which is interconnected by the clutch.

The shaft 20 passes through a sleeve 21 which is integrally formed with the clamping plate 16. On the outer or right face of the plate 16, as viewed in Fig. 1, is formed a plurality of pairs of spaced lugs, with the pairs being equally-spaced circumferentially around the face of the plate 16. In the present instance, three such pairs of lugs are shown, although this number may be varied as desired. Between each pair of lugs 22 is pivotally mounted a bell crank lever 23 and one arm of each lever extends radially inward of the clutch and is provided with an elongated slot 24 within which operates a pin 25 carried by a lug 26 that is formed on an operating collar 27. This collar encircles and is shiftable endwise along the sleeve 21 and may be provided with the usual trunnions 28 for engagement by any desired actuating means, such as a shifting fork (not shown).

The other arm of each lever 23 extends generally parallel to the axis of the shaft 20 and the extremity thereof carries a roller 29 which bears against an adjusting ring 30 that is threaded in a supporting ring 31 mounted on the extremities of the driving studs 11. The adjusting ring 30 carries a radially extending finger 32, preferably formed of springy material, which is intended to seat in any one of a number of recesses or slots 33 that are spaced around the supporting ring 31 in order to maintain the adjusted position of the ring 30. The usual release springs 34 may be interposed between the face 14 of the flywheel and the base of pockets 35 provided in the clamping plate 16.

In Fig. 1, the clutch is shown in engaged position and it will be particularly noted that the radial distance of the pivot of the lever 23 from the axis of the shaft 20 is greater than the corresponding distance of the axis of the roller 29, or, expressed in other words, the lever 23 has been moved to an over-center position, thus locking the clutch in position. This locking is accentuated by the extending action of release springs 34.

To release the clutch, it is simply necessary to move the operating collar 27 toward the right from the position illustrated in Fig. 1 until the center of the roller 29 has moved outwardly a distance greater than the radial distance of the pivot of the lever 23 from the axis of the shaft 20. The clamping plate 16 will thereby be moved towards the right hand and this release position of the plate, as well as of the levers 23, will be maintained by the extending action of the springs 34. The levers 23 are also held in release position by centrifugal force under idling conditions. When the clutch is engaged, the operating collar 27 is moved towards the left from the position just described, thereby causing the roller 29 to bear against the adjusting ring 30 and move the clamping plate 16 to grip the driven plate 19 between the faces 14 and 17 against the action of the release springs 34. The endwise shifting of the collar 27, as just described, is continued until it engages a shoulder 36 formed on the sleeve 21, thus determining the over-center position of the levers 23 and preventing excessive overlock of the levers.

The driving studs 11 not only drivably connect the clamping plate to the flywheel and support this plate, together with the operating levers, but they also serve as a supporting agent for the adjusting mechanism of the clutch levers. As the friction facings 18 wear, suitable adjustment is effected by rotating the adjusting ring 30, since the bell crank levers 23 have a constant throw and it is necessary to axially shift the ring 30 to compensate for the axially shifted position of the levers. Generally speaking, the clutch is characterized by compactness of design, ease and adjustment of operation, and particularly, by ease of attachment and detachment to and from the flywheel through the medium of the driving studs 11.

I claim:

1. In a clutch, the combination of a clamping plate having a tubular extension coaxial with the axis of the clutch, pin means adapted for mounting in a rotary part constituting one of the members of the clutch and having driving and supporting connection with the plate, an abutment member carried by the pin means, an operating lever pivoted on the plate and adapted to fulcrum on the member for shifting the plate to driving position, and means shiftable on the extension and engageable with the lever to actuate the same.

2. In a clutch, the combination of a clamping plate having a tubular extension coaxial with the axis of the clutch, pin means adapted for mounting in a rotary part constituting one of the members of the clutch and having driving and supporting connection with the plate, an abutment member carried by the pin means, an operating lever pivoted on the plate and adapted to fulcrum on the member for shifting the plate to driving position, and a collar shiftable on the extension and having a part cooperable with the lever to actuate the same

HENRY J. DUNKELOW.